US012254108B2

(12) United States Patent
Madan et al.

(10) Patent No.: US 12,254,108 B2
(45) Date of Patent: Mar. 18, 2025

(54) DISALLOWING READS ON FILES ASSOCIATED WITH COMPROMISED DATA ENCRYPTION KEYS

(71) Applicant: Dell Products L.P., Round Rock, TX (US)

(72) Inventors: Nitin Madan, Cupertino, CA (US); Srisailendra Yallapragada, Cupertino, CA (US); Mahadev Karadigudda, San Jose, CA (US); Madhu Agrahara Gopalakrishna, Fremont, CA (US); Srikanth Srinivasan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 478 days.

(21) Appl. No.: 17/682,174

(22) Filed: Feb. 28, 2022

(65) Prior Publication Data

US 2023/0274013 A1 Aug. 31, 2023

(51) Int. Cl.
*G06F 21/62* (2013.01)
*G06F 16/14* (2019.01)
*H04L 9/08* (2006.01)

(52) U.S. Cl.
CPC ........ *G06F 21/6218* (2013.01); *G06F 16/152* (2019.01); *H04L 9/0891* (2013.01); *G06F 2221/2141* (2013.01)

(58) Field of Classification Search
CPC .............. G06F 21/6218; G06F 16/152; G06F 2221/2141; G06F 11/1453; H04L 9/0891; H04L 9/0643; H04L 9/0894; H04L 9/3239
See application file for complete search history.

(56) References Cited

U.S. PATENT DOCUMENTS

| 8,117,160 | B1* | 2/2012 | Tang ..................... G06F 16/128 |
| | | | 707/649 |
| 9,336,092 | B1* | 5/2016 | Li .......................... G06F 21/602 |
| 9,432,192 | B1* | 8/2016 | Pogde ................... H04L 9/0836 |
| 9,740,870 | B1* | 8/2017 | Shepard ................. G06F 21/60 |
| 10,353,867 | B1* | 7/2019 | Wong .................... G06F 16/162 |

(Continued)

OTHER PUBLICATIONS

Qin, Chuan, et al. "The Design and Implementation of a Rekeying-Aware Encrypted Deduplication Storage System." ACM Transactions on Storage, vol. 13, No. 1, 2017, pp. 1-30. (Year: 2017).*

*Primary Examiner* — Theodore C Parsons
*Assistant Examiner* — James P Moles
(74) *Attorney, Agent, or Firm* — Staniford Tomita LLP

(57) ABSTRACT

A method of blocking access to files encrypted with a compromised key by mapping keys and ranges of containers encrypted by the keys. Upon notification that a key is compromised, fencing a container range corresponding to data segments encrypted by the compromised key to prevent deduplication operations on the segments. The method makes a point-in-time copy of the filesystem managing the segments, wherein each file of the file system is represented as tree structure having a root level and other levels. The method iteratively inspects in a level-wise manner, each container in each level of the file trees of the files to identify containers having segments encrypted by the compromised key, and marks files corresponding to the identified containers as not readable to block the access to the files encrypted with the compromised key.

14 Claims, 10 Drawing Sheets

(56) References Cited

U.S. PATENT DOCUMENTS

| | | | |
|---|---|---|---|
| 10,733,306 B2* | 8/2020 | Lum | H04L 9/0618 |
| 11,836,267 B2* | 12/2023 | Hetzler | H04L 9/0894 |
| 2010/0274772 A1* | 10/2010 | Samuels | G06F 16/188 |
| | | | 707/693 |
| 2016/0154963 A1* | 6/2016 | Kumar | G06F 21/602 |
| | | | 713/189 |
| 2017/0123935 A1* | 5/2017 | Pandit | G06F 16/2219 |
| 2018/0329785 A1* | 11/2018 | Mosek | G06F 11/1451 |
| 2020/0159726 A1* | 5/2020 | Miller | G06F 16/2455 |
| 2020/0342117 A1* | 10/2020 | Richards | G06F 16/122 |
| 2021/0042327 A1* | 2/2021 | Jia | G06F 17/18 |
| 2021/0334206 A1* | 10/2021 | Colgrove | G06F 3/0638 |
| 2021/0377016 A1* | 12/2021 | Perlman | H04L 9/0891 |

* cited by examiner

DISALLOWING READS ON FILES ASSOCIATED WITH COMPROMISED DATA ENCRYPTION KEYS

TECHNICAL FIELD

Embodiments relate generally to data encryption, and more particularly to cryptographic key management for cached data and metadata.

BACKGROUND OF THE INVENTION

With the increasing need to secure data access in data storage systems, it is necessary to ensure that data is secure throughout its lifecycle from on-disk storage to in-memory access. It is also necessary to ensure that sensitive user data, cached data and metadata (persistent media) is encrypted and secure to prevent any unwanted access or theft of such data. Current key-based encryption systems encode the data such that it can only be accessed or decrypted by a user with the correct encryption key. Key-based encryption can be symmetric where one secret key is used to both encode and decode the data, or asymmetric where encryption key is done using a public key and decryption is done using a private key.

The Data Domain File System (DDFS) is an example of a deduplication storage system that supports data at rest encryption (DARE). This implies all data stored on disk is encrypted. Any storage solution that encrypts data requires an encryption key or keys, which are typically sourced from one of the supported key managers.

In recent years, there has been some standardization around key management, such as the Key Management Interoperability Protocol or KMIP, which is one of the industry standards for hosting/managing crypto objects including data encryption keys. DDFS supports keys being managed by KMIP compliant key managers.

Users have one or more keys encrypting all the data stored on the disk. These keys can be externally managed, and one or more such keys can be compromised. There is presently no method or system to identify files impacted by compromised keys and prevent read operations on the files encrypted with a compromised key. What is needed, therefore, is a file system that prevents such reads to protect stored data from use of compromised keys.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of Dell EMC Corporation.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

DETAILED DESCRIPTION

Figure 1:
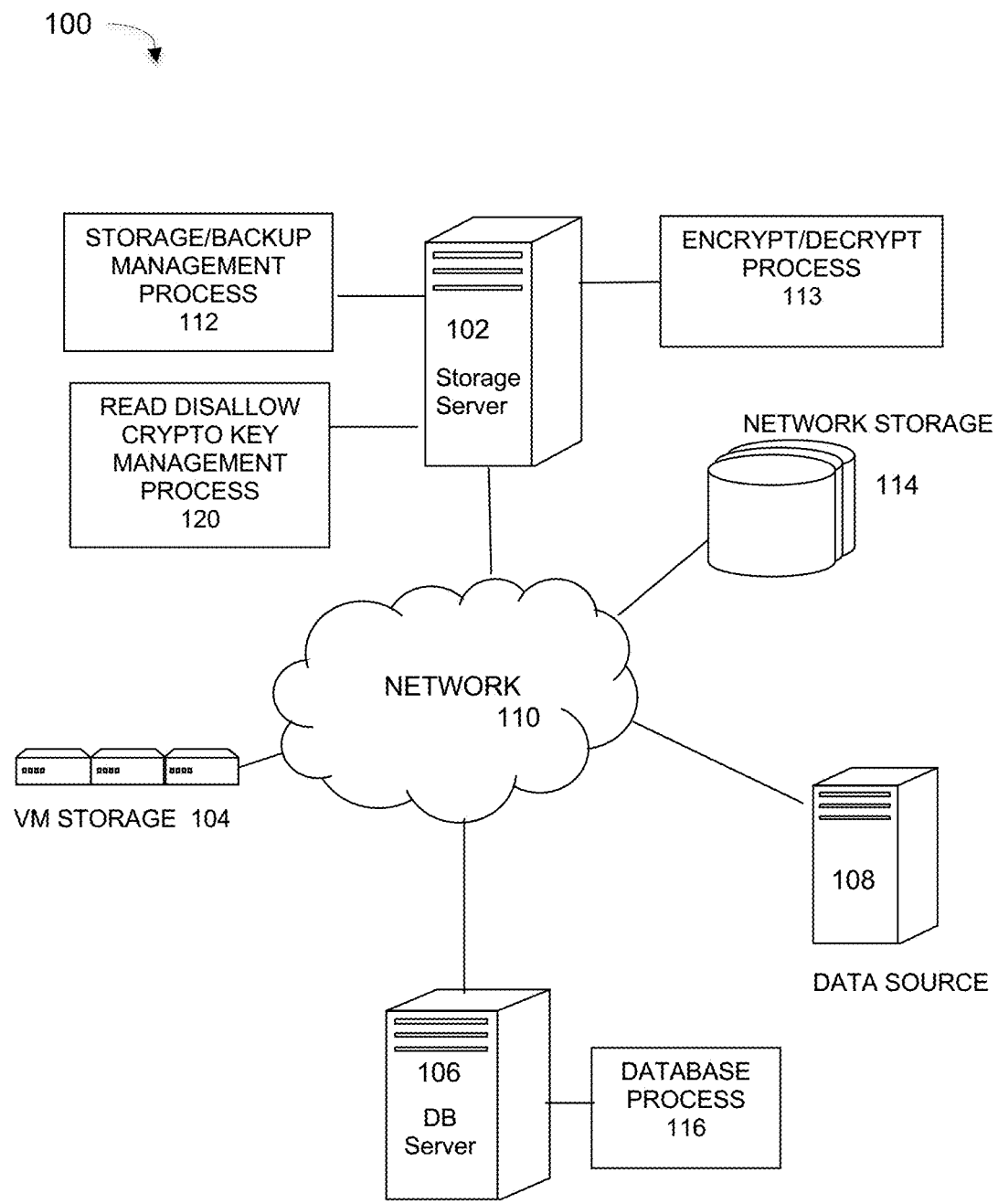
FIG. 1 is a diagram of a computing network implementing a dynamic cryptographic key management system for cached data, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

As stated previously, a key rotation process helps reduce the amount of data at risk if an encryption key is compromised. However, in a large deduplicated storage system there can be millions of deduplicated segments impacted by the compromised key(s) which in turn can be referred by thousands of files with each segment being referred to by one or more files. With no reverse mapping from the segments to the file, re-encrypting the data with non-compromised keys becomes a challenging problem. Embodiments of system 100 provide an additional layer of security in efficiently identifying files referring to segments which are impacted by compromised key in a time predictable fashion and disallow them from being read until a system administrator can re-encrypt the impacted content with new key. Other aspects include an option to ensure newer contents do not deduplicate the segments impacted by the compromised key until such segments are re-encrypted with new keys.

FIG. 1 illustrates a networked data storage system that implements one or more embodiments of a method to identify and disallow reads on files associated with a compromised key, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

Data Domain is an example of a purpose-built backup appliance providing streaming deduplication that is able to ingest data at full network speeds, from multiple backup sources while providing storage efficiency. In layered file system architectures, data at rest may be prefetched (in decrypted form) and then re-encrypted in the storage layer.

Encryption keys used for encrypting data at rest are rotated at cadence to ensure that large amounts of data are not dependent on a single encryption key, which creates the risk of a single point of failure when securing data at rest. Data encryption key management system 100 is handled by a dedicated cryptographic key management module 120 that ensures that key rotation is handled seamlessly. Module 120 also handles the various intricacies of data encryption key-state transitions and key compromised workflows to provide dynamic cache data management for every key-state flow. In general data 'at rest' refers to data that is stored in persistent storage (e.g., hard disk) of an active tier as user data. Other types of data include cached data, and data in transit.

Embodiments of the cryptographic key management module also manage different key rotation workflows based on the type of key-manager being used. This includes handling the case where a data encryption key is compromised. In present systems, handling a compromised data encryption key is an involved process where the entire data set in the system must be scanned to find all the relevant data dependent on that compromised key. All relevant data must then be re-encrypted with a new secure key in the system and only after all data dependencies on the compromised key are handled, can the compromised key then be deleted from the system.

A key can become compromised due to a variety of reasons or acts. For example, a compromised key can result from the unauthorized disclosure of a key so that all data encrypted by that key could be accessed by unauthorized parties. The integrity of a key could be compromised by invalid modification or substitution so that the key could be used for the wrong purpose or for the wrong application. The key's association with the owner could be compromised so that the identity of the other party cannot be assured or the data cannot be properly decrypted. Finally, the key's association with other information can be compromised so that the key is not associated with any data or the wrong data.

In an embodiment, the cryptographic key management system is used in a data storage system that implements a deduplication backup process, such as a Dell EMC Data Domain (DD) system. The Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using SHA 1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system that forms segments from data, these segments are uniquely identified by their key/label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A fingerprint is thus a compact representation of the actual data (or segment). The data (or segment) is passed through a SHA-1 (Secure Hash Function) cryptographic hash function. This produces a hash value (size 20 bytes), and this hash value is called a "fingerprint." Each unique data segment will generate a unique fingerprint (e.g., 20 bytes in size) and this fingerprint is used to index and get the actual data segment. Basically, the fingerprint is a compact representation of the actual data, and is used to deduplicate the data ingested into the file system.

A file in DDFS is represented by a Merkle tree, with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

Figure 2:
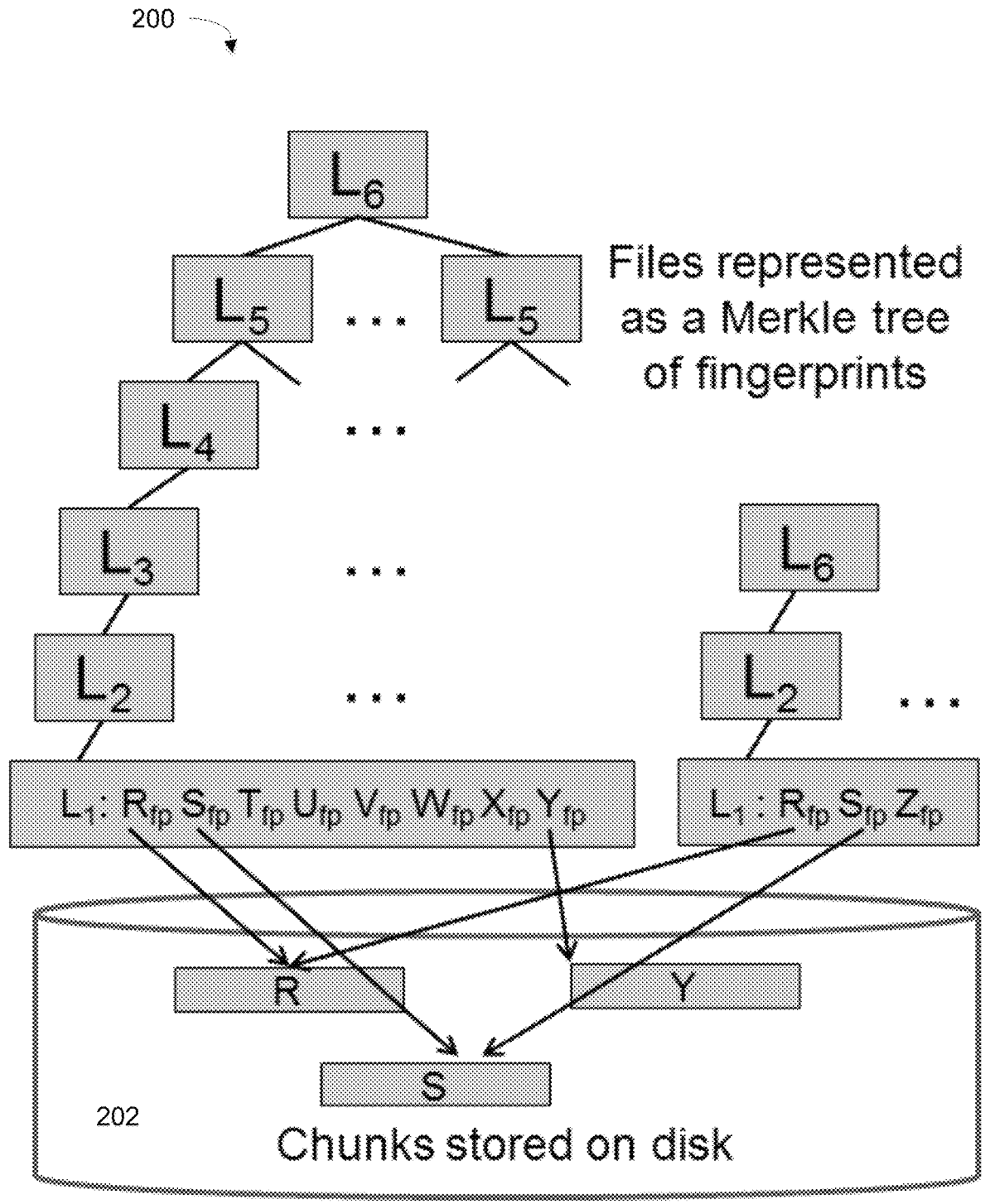
FIG. 2 illustrates files an example Merkle tree representation of files in a deduplication backup system, under some embodiments.

FIG. 2 illustrates files an example Merkle tree representation of files in a deduplication backup system, under some embodiments. As shown in FIG. 2, Merkle tree 200 comprises layers L0 to L6. The chunks directly written to disk 202 are referred to as $L_0$, meaning the lowest level of the tree. Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough not to need intermediate nodes such as the example on the right side of the figure. The $L_1$-$L_6$ chunks are referred to as $L_p$ chunks, where p is a parameter that ranges from 1 to 6 and indicates metadata representing the file. Deduplication takes place because a chunk can be referenced multiple times. The file system is a forest of Merkle trees, but these trees are not disjoint, particularly at the lowest level. In general, $L_p$ chunks are themselves stored on disk in containers, which include a relatively small (hundreds of KB) metadata section with a list of fingerprints for the chunks within the container. Thus, they may be read more quickly than the full container.

A Data Domain or similar system can efficiently copy an existing file using the same underlying Merkle tree. It creates the new file with a new name, and therefore a new $L_6$ root of the tree, but that tree then references the identical $L_P$ chunks. As this operation involves only the root of the tree, it is trivially fast and does not increase physical space in use beyond the one chunk containing the $L_6$.

Figure 3:
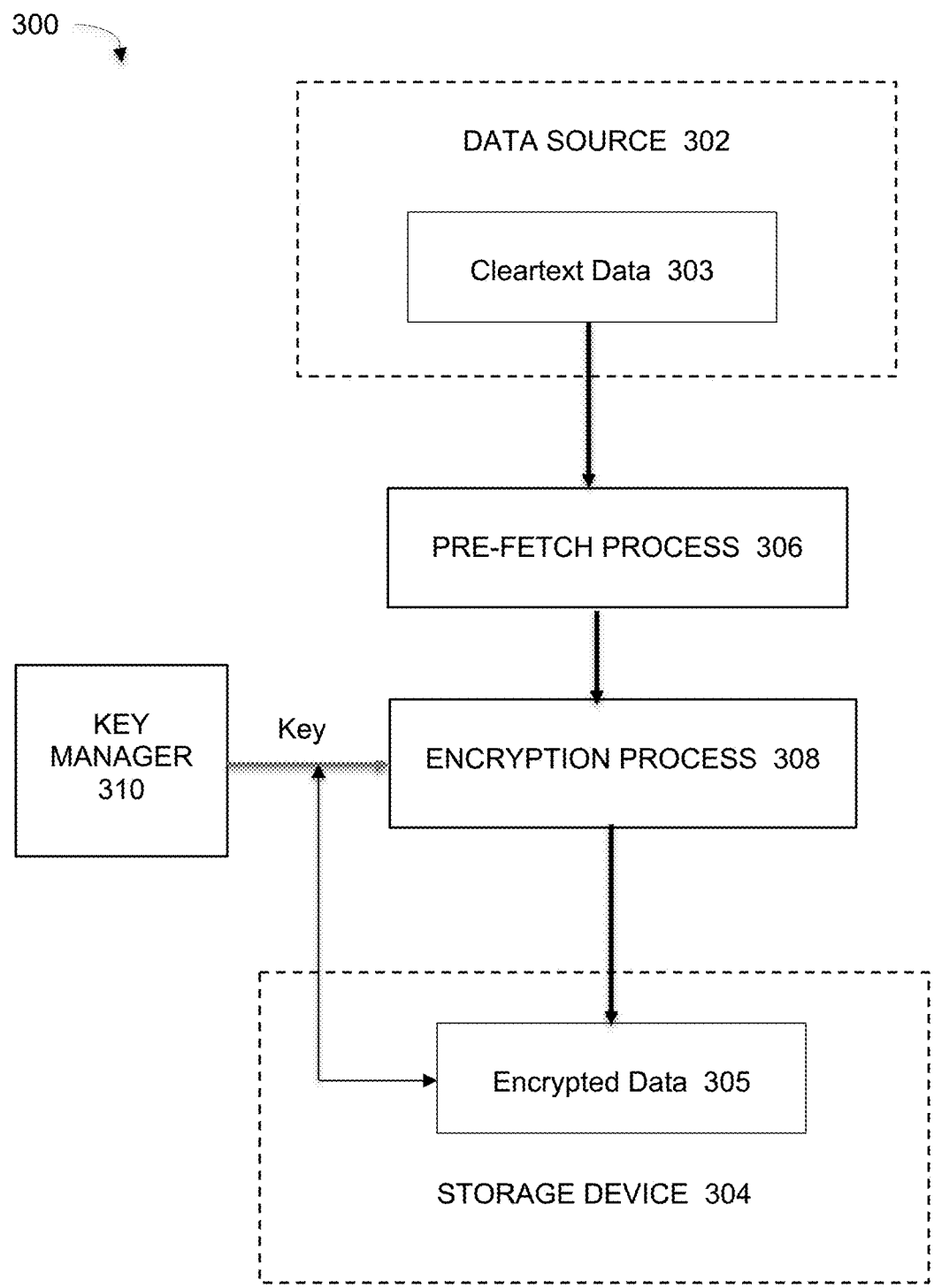
FIG. 3 illustrates the implementation of the cryptographic key management process between storage layers, under some embodiments.

In an embodiment, the cryptographic key management process 120 is used between data sources and storage devices of a data storage system. FIG. 3 illustrates the implementation of the cryptographic key management process between storage layers, under some embodiments. As shown in system 300 of FIG. 3, the data source 302 provides the original or cleartext data 303 to be stored through back up or similar operations. For cache-based systems, a prefetch process 306 may be used to populates a cache from an active tier (e.g., 202) to allow I/Os to be processed as fast as possible for processed datasets. For the embodiment of FIG. 2, data is provided from the data source 302 as cleartext (non-encrypted) data. It is then encrypted by encryption process 310 using a key provided by the key manager process 310. This results in encrypted data 305 being stored in the cache or storage device 304.

Figure 4:
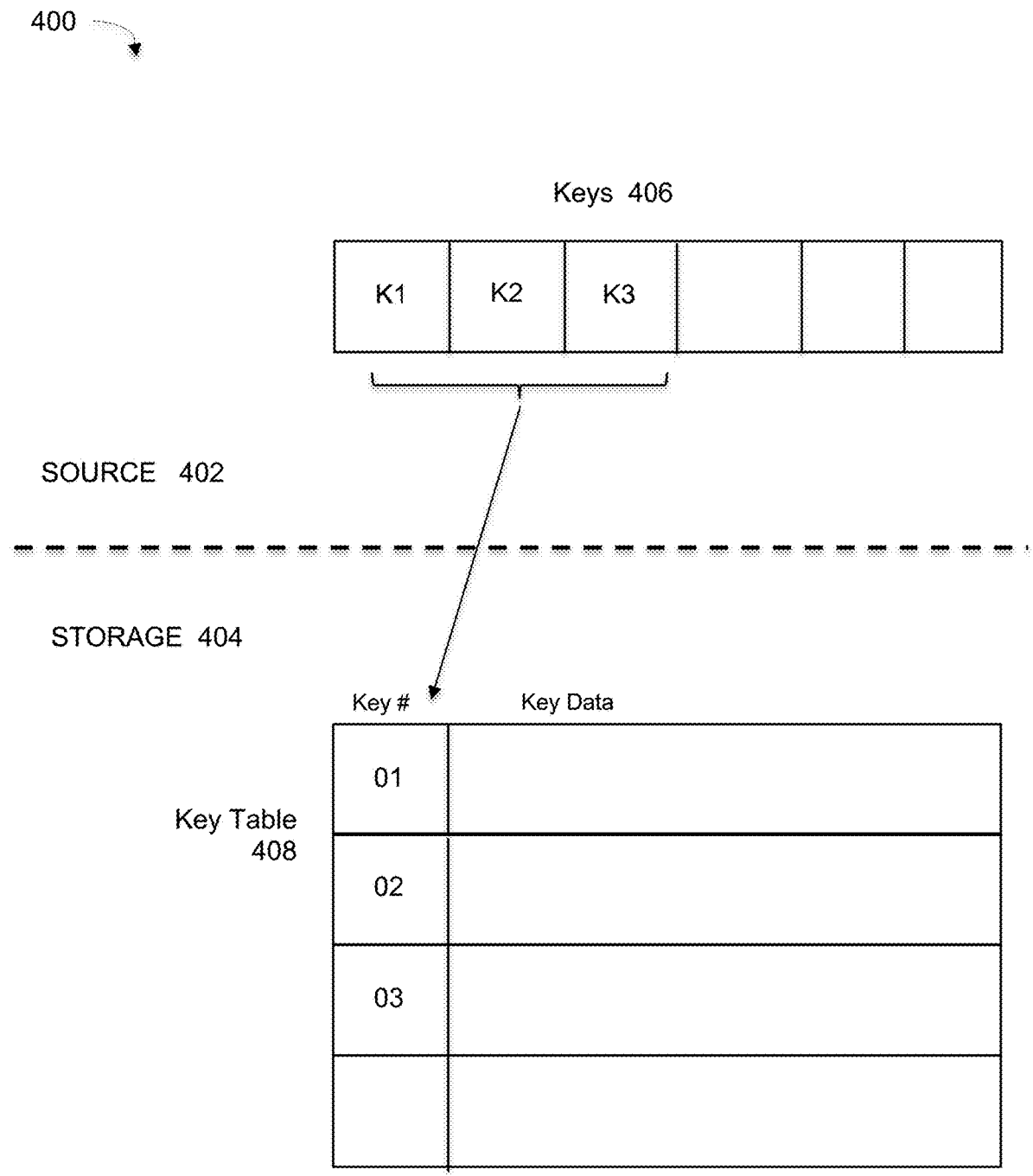
FIG. 4 illustrates the use of a key table for a cryptographic key management process, under some embodiments.

In an embodiment, a key table is maintained in the system, such as in the data source 302, to keep track of keys used in the cache tier. FIG. 4 illustrates the use of a key table for a cryptographic key management process, under some embodiments. As shown in diagram 400 of FIG. 4, the source tier 402 utilizes a number of encryption keys 406 denoted keys K1, K2, . . . . Kn, for successive keys as they are rotated/updated over time by the key manager 310. The storage tier 404 maintains a key table 408 that has corresponding entries for each of the keys. A cache data/metadata block header includes key data comprising encryption algorithm, key attributes, initialization vector used for encryption, and the length of the encrypted block. For every block of data, the block header points to the corresponding key in key table 408 through the key number index to manage the keys 406 in the source tier. This active management can comprise initiating keys, putting keys in a pre-active state, moving keys an active state, de-activating keys, marking keys as compromised/destroyed status, and so on. The key management process can use any appropriate number of states to designate the current status of each of the keys.

File systems, such as DDFS, store data in compression regions which are packed into immutable containers. The containers are formed by concatenating compression regions, along with some metadata. The storage data structures encode the encryption key ID as part of the metadata. Another data structure holds the mapping of key ID to the key in an encrypted data store. By having this two-level translation (key ID-to-key) DDFS created a method to have multiple valid keys for the data at rest. The system uses a key for a set of containers and then changes the key to a new key, which will be used by the next set of containers.

In an embodiment, system 100 implements a Key Management Interoperability Protocol (KMIP) for hosting and managing data encryption keys, as well as other crypto objects. DDFS generally supports keys being managed by KMIP compliant key managers. The key manager implements a key rotation process that cycles through data portions to encrypt successive groups of data using different keys (1 to n) as shown in FIG. 4. This provides multiple advantages, including reducing the amount of data at risk if a key were to be compromised, and reducing the amount of data that needs to be re-encrypted in a key compromise event, and thus the recovery time.

In a DDFS system, as data is ingested to the filesystem, the system anchors and segments the data. The fingerprints for the data are then computed using a hashing method. These fingerprints are looked up in a big hash table (index), and if the fingerprints do not exist, the segments would be compressed and encrypted and packed into compression regions. The compression regions, in-turn are sandwiched into a data structure called the containers. A file, in turn, is a logical list of fingerprints. When the file is read, the fingerprints are looked up, and the container and the compression region corresponding to the fingerprint, brought into memory, decrypted, de-compressed and read. The buffer is then returned to the upper layers of the filesystem, and finally to the application request.

Figure 5:
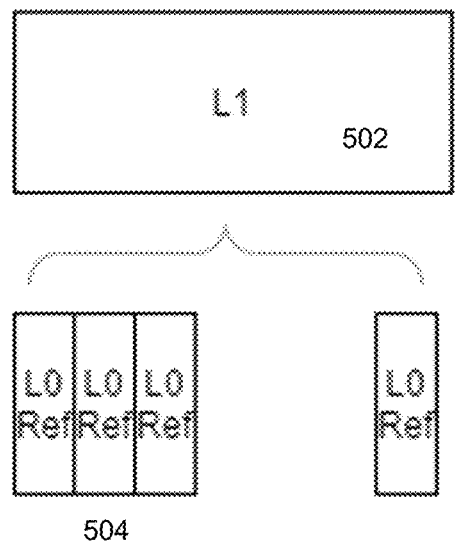
FIG. 5 illustrates an L1 segment referenced by multiple L0 refs (fingerprints), in an example embodiment.

As shown in FIG. 2, the filesystem organizes the "list of fingerprints" associated with a file in a Merkle tree 200. This allows for easy access to a certain offset. The L1 segment is a list of L0 refs or fingerprints which are sandwiched together. Each L0 ref (fingerprint) points to data. This is illustrated in FIG. 5, which illustrates an L1 segment 502 referenced by multiple L0 refs 504, in an example embodiment.

Figure 6:
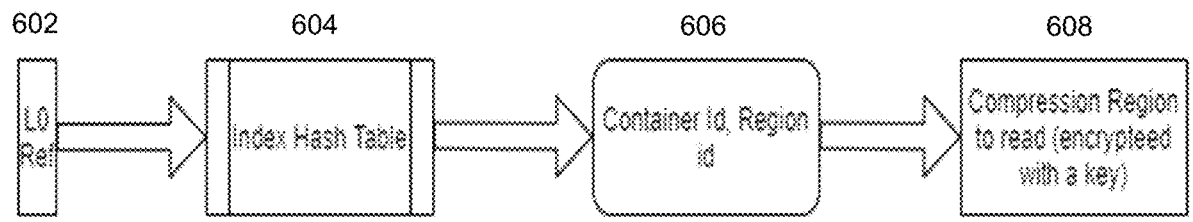
FIG. 6 illustrates an L0 ref accessing an index hash table that provides a container ID and region ID that accesses compression region, under an example embodiment.

To access the data, the fingerprint must be looked up using the index, which would return the container ID and the region ID within the container. The compression region metadata holds the key ID, which is then used to read the encrypted key to decrypt the compression region. This is illustrated in FIG. 6, which illustrates an L0 ref 602 accessing an index hash table 604 that provides a container ID and region ID that accesses compression region 606.

It is possible that a file is pointing to compression regions in different containers all of which have different encryption keys. In the event of a key compromise situation, the filesystem would try and find out the compression regions compressed with the insecure key. The data is then read and re-encrypted with a new key. Once all the data has been re-encrypted and written over a new location, the compromised key is discarded and the compression regions and containers reclaimed. However, this process takes time, and is directly proportional to the size of the data, encrypted by the compromised key.

As mentioned above, in a large deduplicated storage system, there can be millions of deduplicated segments impacted by compromised key, which in turn can be referenced by thousands of files with each segment being referred to by one or more files. With no reverse mapping from the segments to the file, this becomes a hard problem to solve.

Embodiments of system 100 provide an additional layer of security to efficiently identify files referring to segments which are impacted by compromised key in a time predictable fashion and disallow them from being read until the content can be re-encrypted with a new key. As shown in FIG. 1, system 100 includes a process 120 that disallows data reads and ensures new data does not deduplicate the segments impacted by the compromised key until such segments are re-encrypted with new keys.

In an embodiment, a security manager component maintains a map of keys and the range of containers each specific key is protecting. This notification can be performed during a periodic sync in which the key manager notifies the filesystem of the compromise event, or it can be done by manual notification by a system administrator. Once the filesystem manager has been notified of the range of containers impacted by the compromised keys, the filesystem manager takes the following actions to identify the files referring to content impacted by the compromised keys, and prevents them from being accessed until the compromised content has been re-encrypted with a new key. Additionally, it also disallows newer files from deduplicating to the compromised content until they are re-encrypted with a new key.

Figure 7:
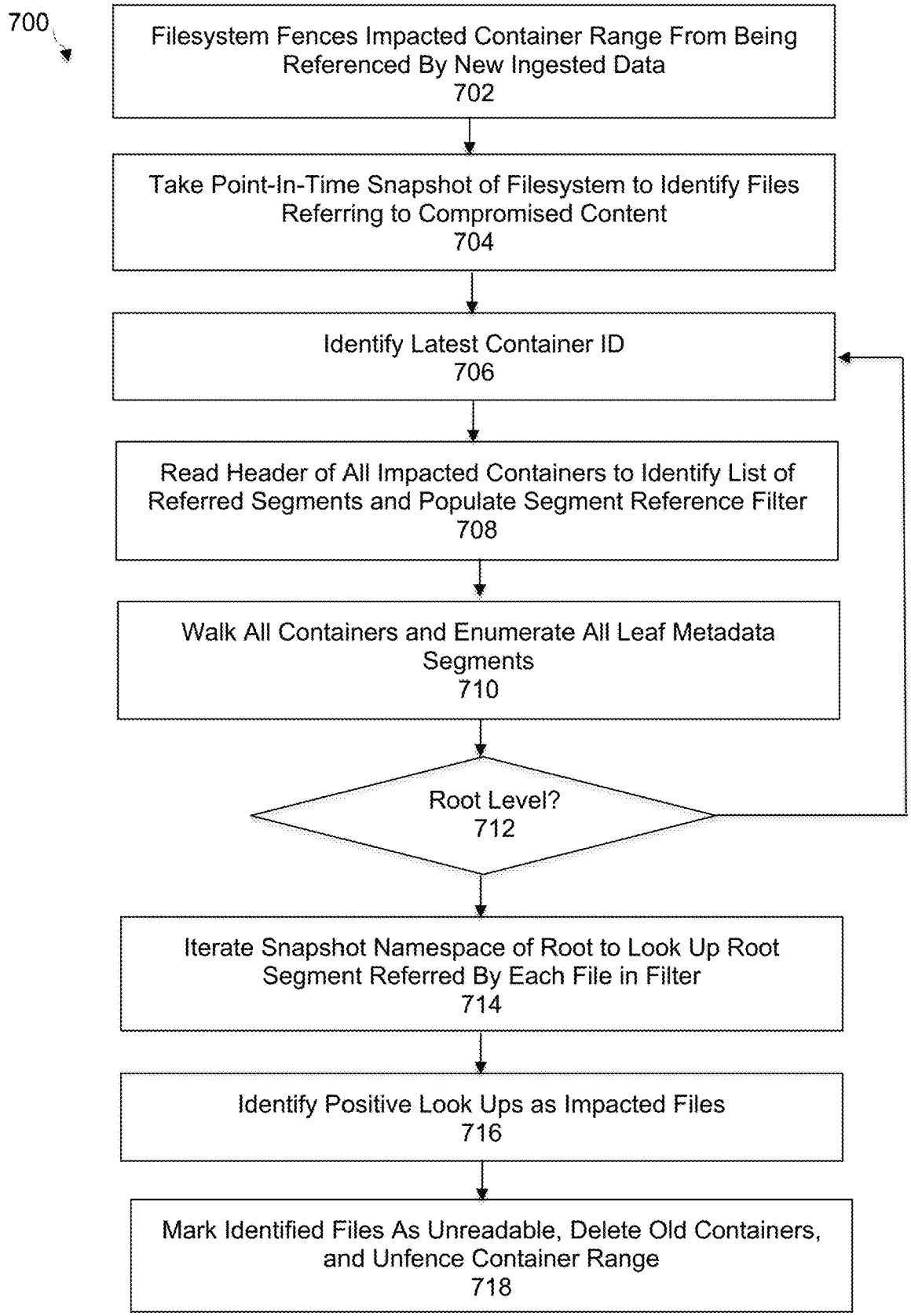
FIG. 7 is a flowchart illustrating a method of disallowing reads and deduplication of data impacted by compromised encryption keys, under some embodiments.

FIG. 7 is a flowchart 700 illustrating a method of disallowing reads and deduplication of data impacted by compromised encryption keys, under some embodiments. As shown in FIG. 7, upon being notified of the range of containers impacted by the compromised key, the filesystem fences the impacted container range from being referred to by newer data ingest, 702. This is done by notifying the deduplication engine of the container range to avoid duplicating to. The deduplication engine ensures that it writes a new duplicate copy for such segments if referred to by newer data ingest. This ensures that no new files refer to the impacted content while the system is busy fixing it.

After the fencing step 702, the process derives a point-in-time (PIT) stable copy of the filesystem that will be used to identify files referring to the compromised content, 704. This is done by taking a snapshot which ensures all dirty data falling the snapshot range are flushed to disk and a stable immutable copy of the namespace is manufactured for the purpose of namespace iteration. This snapshot can be referred to as 'snap-x.'

The next step is to identify the latest container ID, 706. All containers starting from the lowest container ID to the highest container ID hold segments that may be referred to by files in the snapshot namespace of snap-x. This is the range of containers that will be repeatedly scanned for level-by-level reverse physical enumeration to reverse engineer the Merkle tree branch from the impacted segments to the files referring to the impacted segments. The scan uses a data structure to store the segments identified at each level. This data structure can be either a bitmap based on perfect hashing or a probabilistic data structure, like a Bloom filter or quotient filter. This data structure is referred to herein as a 'segment-reference filter.'

The process 700 next reads the container header of all containers impacted by the compromised key to identify the list of segments referred to by these containers and populate the segment-reference filter by marking the filter with a list of segments impacted by the compromised keys, 708.

Walk all containers in the demarcated range and enumerate all leaf metadata segments, 710. Lookup the segment-reference filter for every enumerated child segment. If we have a positive lookup, the parent segment is referring to a segment that is already identified as a impacted entity. The process marks the parent as impacted by adding the parent segment to the segment-reference filter.

The process of scanning the container range for every level is repeated until the root level is reached, as shown by the iterative loop created by decision block 712. The scan is restricted to segments that belong to only that level for each level of the scan.

On completing the scan for all levels, the process iterate the snapshot namespace of 'snap-x' and looks up the root segment referred by each file in the segment-reference filter, 714. Files whose root-segment have a positive lookup in the filter are identified as the impacted files, 716. Thus, the filesystem manager will have a copy of all the root segments from the segment filter. When there is an attempt to open a file in the filesystem, the manager verifies the root segment of the file against this filter. If there is a match, the file is prevented from being opened. This ensures the file is unreadable until the root segment for that file is removed from this filter.

The process then informs the filesystem manager to mark the identified files as not readable, 718. This ensures that users are not able to read the files while the system is being fixed. The file manager can use persistent extended attributes to make the file access. On a file read/write operation, the user access checks would prevent any access to this file. These extended attributes would be reset after the insecure data has been re-encrypted with a new secure key.

Also in step 718, the segments in the impacted container are copy forwarded which automatically re-encrypts the content as part of the new container writes, and the old containers are deleted. The deduplication engine is advised to unfence the range as it has been deleted and the filesystem manager is advised to restore the original read-write permissions of the files.

Figure 8:
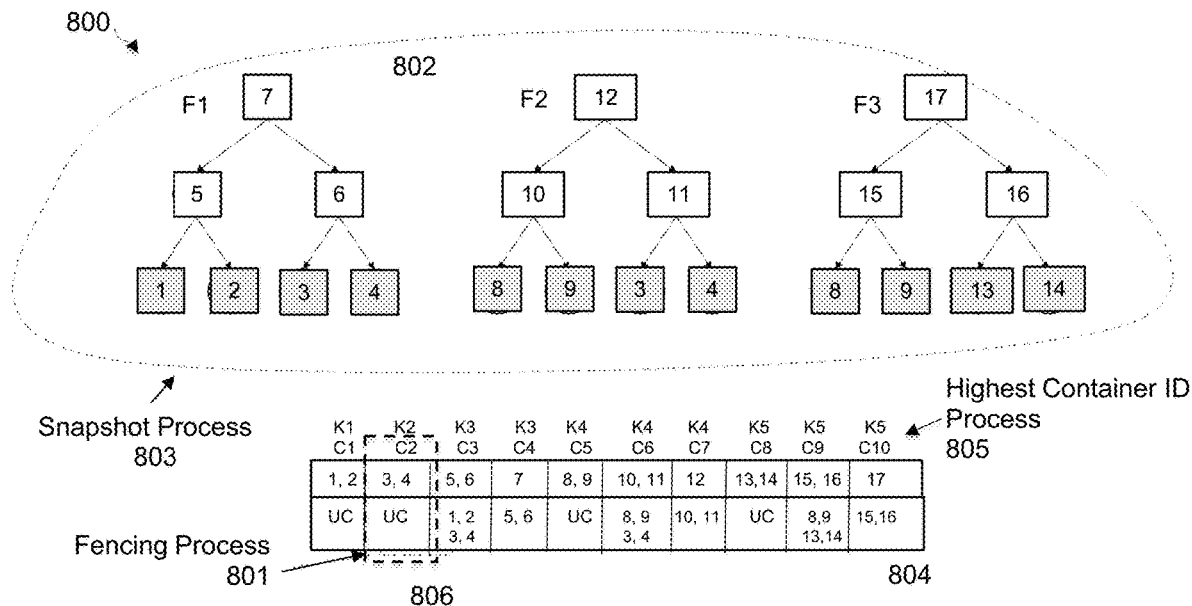
FIG. 8 illustrates an example implementation of the initial steps of process 700 for an example container set.

FIG. 8 illustrates an example implementation of the initial steps of process 700 for an example container set. As shown in diagram 800 of FIG. 8, a fileset 802 comprises three example files denoted F1, F2, and F3. Each file has a corresponding Merkle tree representation of hierarchical leaf nodes, such as represented in FIG. 2. The upper most node '7' for F1, '12' for F2, and '17' for F3 represents the root of each respective file. The sub-nodes comprise fingerprints for lower levels of the hierarchical file tree, as shown in the example.

Table 804 illustrates example containers Cn (e.g., C1 to C10) with each container comprising one or more fingerprints corresponding to the nodes for any of the files F1, F2, F3. Some nodes contain other fingerprints, and some contain user content ('UC'). Each container is encrypted with a corresponding Key Kn. For the example of FIG. 8, five different encryption keys are used as denoted K1, K2, K3, K4, and K5. Some keys (e.g., K3, K4, and K5) are used to encrypt more than one container. Further for the example of FIG. 8, it is assumed that K2 is a compromised key. In this case, the data encrypted by this key (C2) needs to be re-encrypted with a non-compromised new key. As shown in diagram 800, the fingerprints for container C2 are nodes 3 and 4, which are present in both F1 and F2. In accordance with process 700, this impacted container or containers if fenced to ensure that no deduplication process is applied for any new data ingestion. Box 806 illustrates the fencing process 801 around the example impacted container (C2). After the fencing 801, the next step is to take a snapshot of the filesystem or file set 802 by snapshot process 803. This allows the system to iterate a PIT copy of the namespace to identify the files impacted by the comprised key or keys (e.g., K2).

Figure 9:
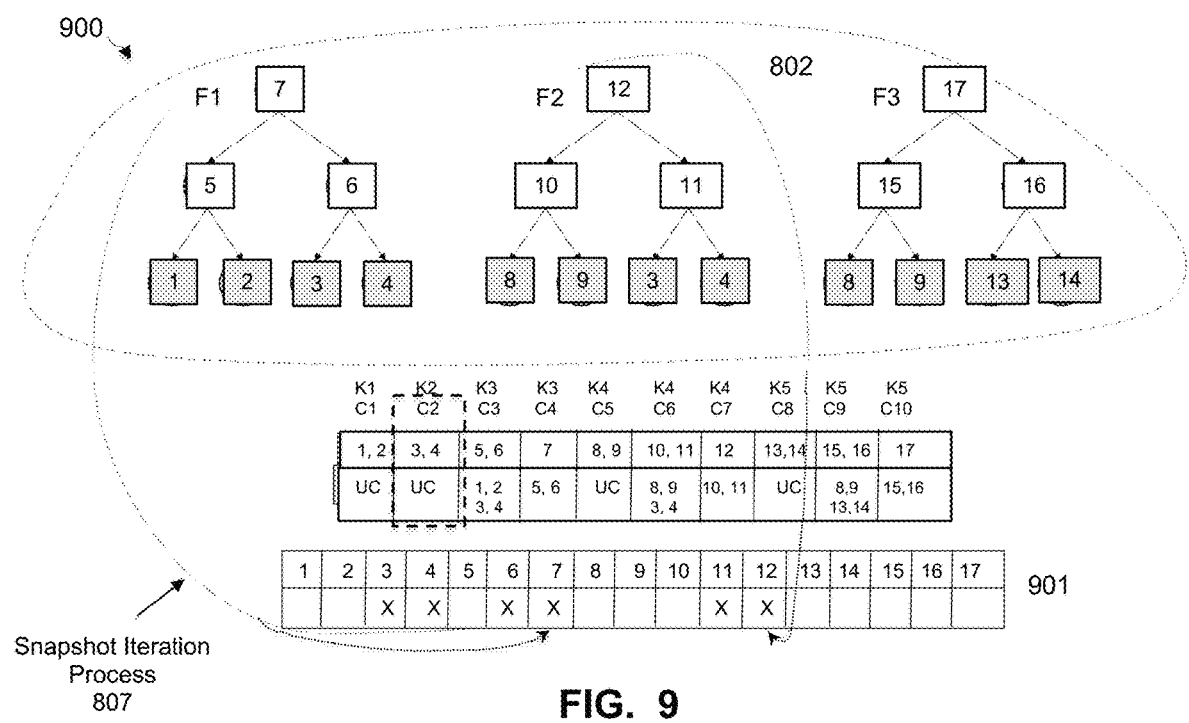
FIG. 9 illustrates the iteration of the snapshot namespace of FIG. 8 by and iteration process, under an example embodiment.

FIG. 9 illustrates the iteration of the snapshot namespace 802 by iteration process 807. As described in steps 706 to 712 of process 700, this process looks up the root segments referred by files in the snapshot against the segment reference filter files whose root segments are marked in the segment reference filter as impacted. For the example of FIG. 8, the compromised key K2 affects container C2, thus implicating fingerprints 3, 4. For the 17 fingerprints of the three files F1, F2, F3, the process walks up the Merkel tree of each file to find that fingerprints 3, 4 also impact fingerprints 6, 7 (of file F1) and 11, 12 (of file F2). File F3 is not impacted by the compromise of key K2 since fingerprints 3, 4 are not present in this file at any level. The data element block 901 of FIG. 9 represents the segment reference filter that indicates the status of each fingerprint 1-17 as impacted by the compromised key in the form of an 'x' next associated with the appropriate fingerprint number. Thus, as shown in FIG. 9, segment reference filter 901 indicates that fingerprints 3, 4, 6, 7, 11, 12 are marked as impacted, as can be verified by the respective Merkel trees for files F1 and F2. The root segments of these files are fingerprints 7 and 12 respectively, as shown by the indicating arrows between the F1 and F2 trees and the segment reference filter 901.

Figure 10:
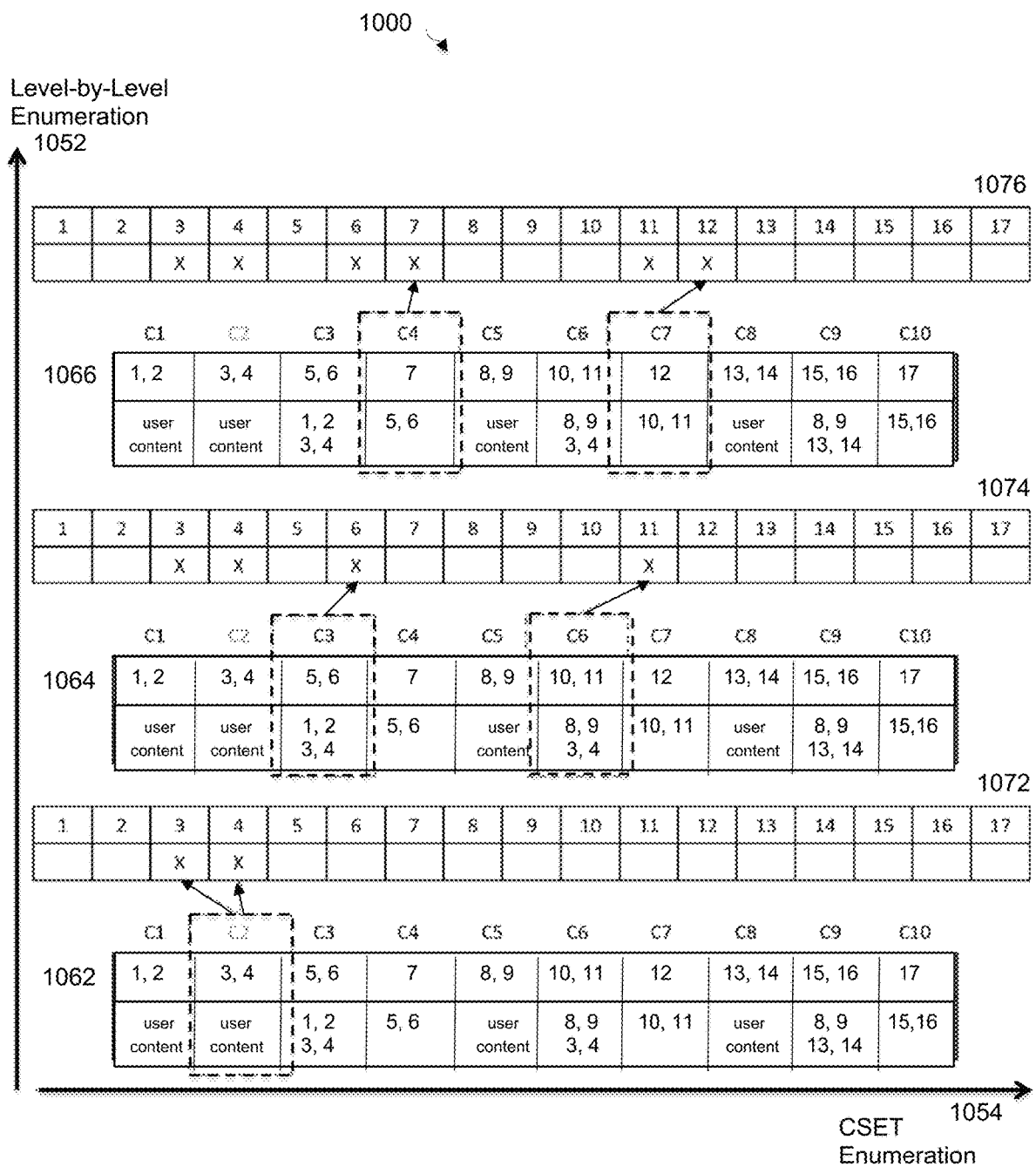
FIG. 10 illustrates the derivation of the segment reference filter 901 for the example of FIGS. 8 and 9.

FIG. 10 illustrates the derivation of the segment reference filter 901 for the example of FIGS. 8 and 9. Diagram 1000 of FIG. 10 illustrates the iterative population of the segment reference filter 1072 along an iterative enumeration process proceeding upwards along the vertical axis 1052, and along a container set (CSET) enumeration process proceeding rightwards along the horizontal axis 1054. Data block 1062 shows the compromised segments at the lowest level, and includes fingerprints 3, 4, as shown above in FIG. 8. The process enumerates and marks the fingerprints from containers impacted by the compromised key. The segment reference filter instance 1072 is thus populated with indicators for fingerprints 3, 4 marked 'X' to show that they involve a compromised key. All container sets C to C10 are in level 1062 are iterated along axis 1054 until the final container (C10) is reached. At this point, the next level 1064 is processed. This corresponds to the next level up for the Merkel trees in snapshot namespace 802. The process enumerates and marks this level's (e.g., level 1) fingerprints that refer to children already marked in the segment reference filter (1072). Iterating among the containers C1 to C10 in this level yields containers C3 and C6 as involving the compromised key. The fingerprints in this example are 5, 6, 10, 11, and the entries for these are marked in the segment reference filter to generate instance 1074. The next level 1066, in this case the root level (level 6), is next processed. The process enumerates and marks the level 6 fingerprints that refer to children that are already marked in the segment reference filter (1074). In this case, containers C4 and C7 are implicated, yielding fingerprints 7 and 12. The final instance of the segment reference filter 1076 is thus generated with these fingerprints marked.

As can be seen in FIG. 10, the process goes container-by-container for a certain level to mark each implicated fingerprint. After all containers are processed, the containers of the next level are processed, and so on. A marked container in the first layer will identify implicated containers of the next higher level through the repetition of the marked fingerprint numbers in the first layer. This process is repeated upward to the root level for all containers in each level, and each level in the Merkel tree of the files. The segment reference filter 1076 for the root level is the final segment reference filter as iteratively populated at each level. This segment reference filter is then used to inform the filesystem manager to mark the corresponding files as not readable. This prevents users from reading these files and stops any deduplication operation on these files. The files can then be re-encrypted using a non-compromised key.

In an embodiment, the files include an extended attribute field that reflects the status of the file as readable or non-readable due to the possible use of a compromised key in encrypting any of the containers of the file. Upon any read/write access attempt on this file, the system checks this attribute field and access attempts to marked files would be disallowed.

As described above with respect to step 708, process 700 stores the list of referred segments of containers impacted by a compromised key in a segment reference filter, such as 1076 in FIG. 10. The segment reference filter can be built using one of the various different data structures, depending on system configuration and requirements.

In an embodiment, the segment reference filter is implemented as a bit-vector based on perfect hashing (PHVEC). Such an embodiments uses certain perfect hash functions to map each fingerprint to a unique bit position in an in-memory perfect hash vector.

Figure 11A:
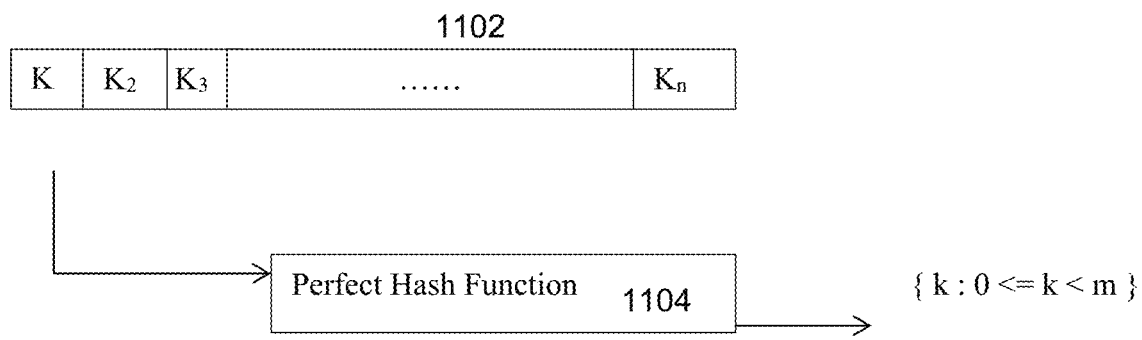
FIG. 11A illustrates a perfect hash function for a fingerprint set that can be used in conjunction with certain embodiments.

In general, a perfect hash function is a collision-free hash function that maps a set of keys of size n to a range of size m where m>n (m=1.43*n). For example, it only requires 2.8 bits per key in a present Data Domain implementation, and is thus is much more compact than the Bloom filter, which requires 6 bits per fingerprint. However, use of the perfect hash vector requires that the hash function should be pre-computed using the entire set of keys first and any key not in the initial set can cause a collision. FIG. 11A illustrates a perfect hash function 1104 for a fingerprint set 1102 that can be used in conjunction with certain embodiments. The perfect hash function phf( ) has the following representation:

$$phf(x)=(f(x)+a_{i(x)}h(x)+b_{i(x)})\% \ m$$

$$i(x)=g(x)\% \ r$$

where f, g, h are uniform hash functions; r is the number of hash buckets in the perfect hash function and a, b are constants that depend on the bucket. The size of the function can be written in terms of a Perfect Hash Vector (PHVEC) as:

$$|PH_{vec}|=|PHF|+|\text{Bit vector}|$$

where |PHF| is the space required to store the per bucket constants.

Figure 11B:
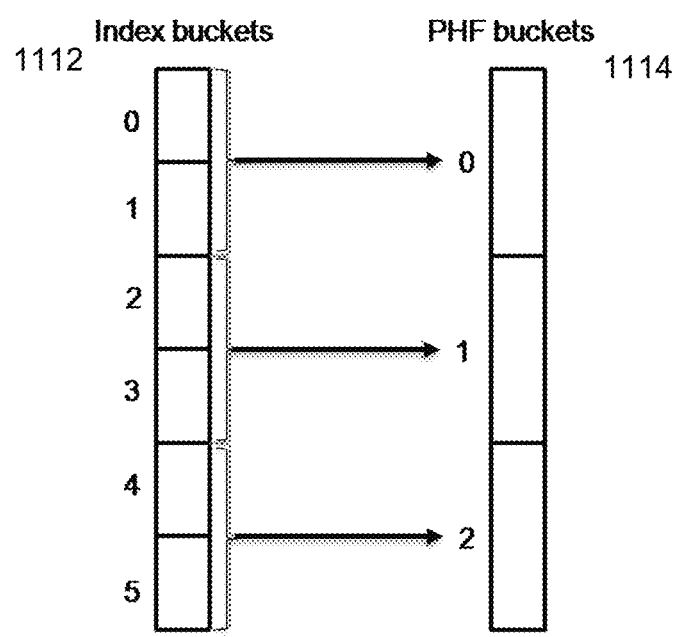
FIG. 11B illustrates a correlation of index buckets to perfect hash function (PHF) buckets, under an embodiment.

The index is further subdivided into multiple partitions such that all the fingerprints in each partition can fit in memory in order to build the perfect hash function for that subset of fingerprints. FIG. 11B illustrates a correlation of index buckets 1112 to perfect hash function (PHF) buckets 1114, under an embodiment. As shown in the simple example of FIG. 3B, index buckets 0 and 1 are put in PHF bucket 0, index buckets 2 and 3 are put in PHF bucket 1, and index buckets 4 and 5 are put in PHF bucket 2.

The PHVEC data-structure ensures that system builds a bitmap with one unique bit referring to a segment in the demarcated container range. This is achieved by using the perfect hashing algorithm to build a collision free hash map for segments contained in the container range. The advantage of this embodiment is that with one unique bit per segment, the data structure avoids all false positives and is able identify the precise list of files impacted by the impacted segments. A PHVEC is generally much more compact than a probabilistic data structure (described below). The disadvantage of the PHVEC data structure is that there is a time and memory cost involved in building a PHVEC. Additionally, if there is any corruption that results in a mismatch between the fingerprints referred to by the files in the snapshot and the fingerprints in the container range that is used for constructing the PHVEC, the precise-ness quality in identifying the files is lost and there may be false positives generated due to collision.

In an alternative embodiment, the segment reference filter is implemented as a probabilistic data structure, such as a quotient filter, Bloom filter, cuckoo filter, etc., as opposed to a deterministic data structure. Probabilistic data structures use hash functions to randomize and compactly represent a set of items, and thus essentially do not provide a definite answer, but instead provide a reasonable approximation of the answer and a way to approximate this estimation. The advantage of this type of data structure is that there is no or very little time cost involved in building the data structure upfront. The disadvantage of a probabilistic data structure is that, by its the very definition, a probabilistic data structure can generate false positive results. The false positives tend to amplify at each level. This effect can by reduced by sizing the data structure large enough, but this imposes a cost of additional memory usage.

In an embodiment, a hybrid approach for defining the data structure of the segment reference filter may be used. Such an approach takes advantage of the fact that probabilistic data structures (e.g., Bloom Filter) work better for large data sets and deterministic data structures (e.g., PHVEC) work with small data sets (as constrained by memory).

Typically, the metadata segments are far smaller in size and number than the data segments. Since the impacted containers tend to be smaller than the overall container range, the hybrid approach would be to use a probabilistic data structure sized only to track segments from the impacted container range, while building a PHVEC for the metadata fingerprints. This vastly reduces the memory footprint for data-structures in general and the cost to build the PHVEC. The probabilistic data-structure tracks all data fingerprints from the impacted container range while the metadata fingerprints are tracked in the PHVEC. The first level of lookup will use the probabilistic data structure to identify parents referring to data fingerprints from the impacted set. Parent fingerprints referring to children in the impacted set are tracked by marking them in the metadata PHVEC. Once the first level scan is complete, subsequent level scans are restricted to the PHVEC, and executed as described above with respect to process 700, and as shown in the example of FIG. 10.

In traditional key-management systems for user data, when a data encryption key is compromised and can no longer be used for encryption, all at rest data encrypted with that key must be decrypted and re-encrypted with a newer data encryption key to ensure data security is not compromised. Embodiments of the segment reference filter processing system provide an efficient method of identifying and disallowing the read files referring to content impacted by compromised encryption keys in a deduplicated storage system. The method performs in a time predictable and cost efficient in terms of memory footprint. It also provides a method to fence content impacted by compromised encryption keys from being deduplicated to by newer files in the duplicated storage system, and ultimately improves the security of the data protected by encryption keys.

Embodiments of the processes and techniques described above can be implemented on any appropriate data storage or backup system operating environment or file system, or network server system. Such embodiments may include other or alternative data structures or definitions as needed or appropriate.

Figure 12:
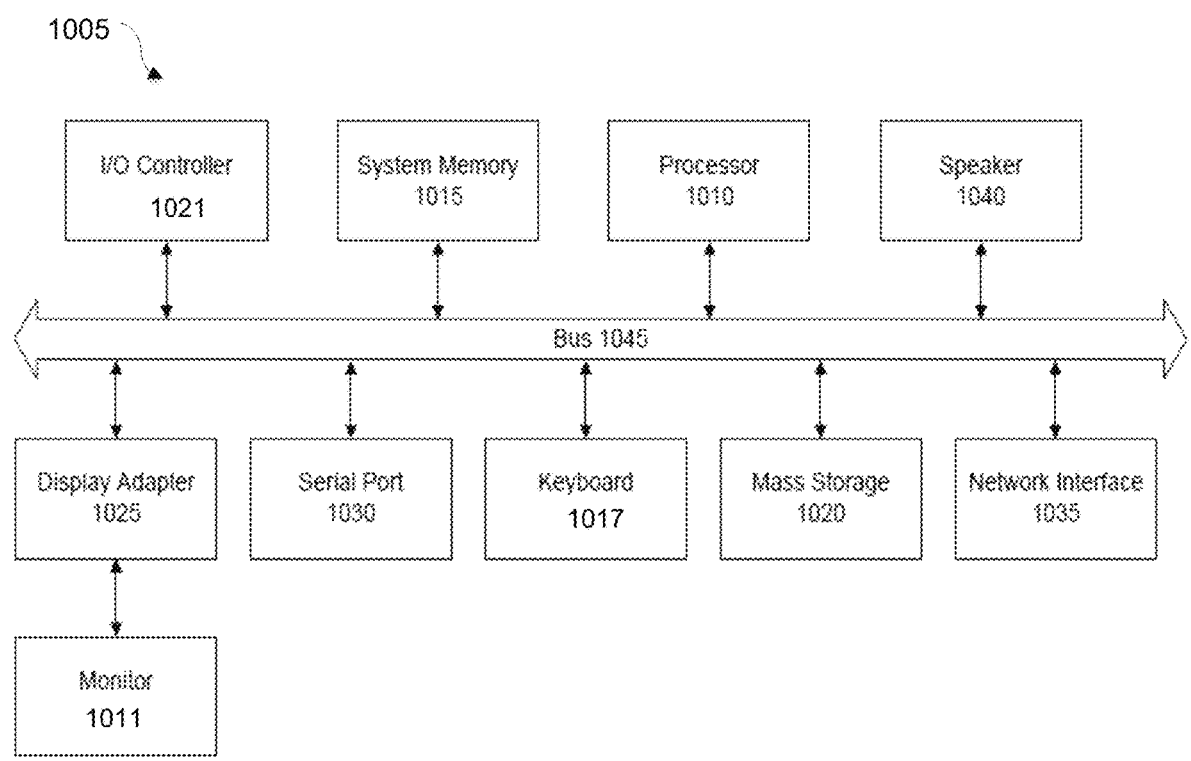
FIG. 12 is a system block diagram of a computer system used to execute one or more software components of the described systems and processes, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 12 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11 g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of blocking access to files encrypted with a compromised encryption key, comprising:

maintaining a map of encryption keys and ranges of containers encrypted by respective encryption keys;

receiving an indication that an encryption key is compromised as a compromised key;
fencing a container range corresponding to data segments encrypted by the compromised key to prevent deduplication operations on the data segments;
making a point-in-time copy of the filesystem managing the data segments, wherein each file of the file system is represented as a Merkle tree storing fingerprints of data using a hashing method and having a root level and one or more hierarchical lower levels;
iteratively inspecting, from the lowest level to a highest level, each container in each level of the file trees of the files to identify containers having segments encrypted by the compromised key for a corresponding level; and
marking files corresponding to the identified containers as not readable to block the access to the files encrypted with the compromised key, wherein data is processed as part of a deduplication backup process executed by a data storage server, and wherein the backup process looks up the fingerprints in a hash table constituting an index to determine if the fingerprints exist or do not exist within the hash table, and if not, compressing and encrypting corresponding data segments into compression regions for storing in the containers, and further wherein a bitmap correlates a container identifier (ID) with a respective encryption key ID, and fingerprints contained in each container referenced by a container ID to tabulate all the fingerprints of the containers as the bitmap, and further comprising marking an entry in the bitmap for each fingerprint of an identified container having segments encrypted by the compromised key, as an impacted fingerprint.

2. The method of claim 1 further comprising storing references to the identified containers in a segment reference filter as the bitmap.

3. The method of claim 2 wherein the segment reference filter comprises one of a deterministic data structure or a probabilistic data structure.

4. The method of claim 3 wherein the deterministic data structure comprises a perfect hash vector (PHVEC), and the probabilistic data structure comprises one of: a quotient filter, a Bloom filter, or a cuckoo filter.

5. The method of claim 1 further comprising using the segment reference filter to enumerate and mark impacted fingerprints from a lowest level to the root level for each Merkle tree to produce a final data element indicating all fingerprints encrypted by the compromised key.

6. The method of claim 1 further comprising:
re-encrypting the marked files with a new encryption key;
deleting containers containing the marked files;
unfencing the fenced container range; and
restoring an original access permission of the marked files.

7. The method of claim 6 wherein each file contains a persistent extended attribute to indicate a file access status based on encryption of any constituent data segments using a compromised key.

8. A computer-implemented method of blocking access to files encrypted with a compromised encryption key, comprising:
defining Merkle tree structures for each file of the set of files processed by a deduplication backup system, the Merkle structure storing compression region fingerprints in a plurality of levels with a root level, and encrypted with a key;
reading a container header of containers impacted by a compromised key to identify a list of segments referred to by the impacted containers;
scanning, in a level-wise manner, containers in each Merkle tree level to find containers with segments encrypted with a compromised key by going up from a lowest to the root level using parent-child references of the Merkle tree;
marking files having segments encrypted with the compromised key as not readable to block accesses to the files;
temporarily fencing the files having segments encrypted with the compromised key from deduplication operations of the deduplication backup system;
storing the list of segments in a segment reference filter data structure as a bitmap tabulating the containers as a horizontal array;
scanning all containers in a demarcated range to enumerate all leaf metadata segments of the files;
looking up, in the segment reference filter, every enumerated child segment to determine a positive or negative lookup; and
referring, for a positive lookup, the parent segment as an impacted segment by adding the parent segment to the segment reference filter.

9. The method of claim 8 further comprising iteratively repeating the scanning step for the demarcated range until all levels to the root level are scanned.

10. The method of claim 8 wherein the segment reference filter is a deterministic data structure, and comprises a perfect hash vector (PHVEC).

11. The method of claim 8 wherein the segment reference filter is a probabilistic data structure, and comprises one of a quotient filter, a Bloom filter, or a Cuckoo filter.

12. The method of claim 11 wherein the data comprises data segments and metadata segments, and wherein the segment reference filter comprises both a PHVEC data structure and a probabilistic data structure.

13. The method of claim 12 further comprising using the PHVEC data structure to enumerate segments from an impacted container range for data segments and using the probabilistic data structure to enumerate segments from the impacted container range for metadata segments.

14. A computer program product, comprising a non-transitory computer-readable medium having a computer-readable program code embodied therein, which, when executed by a processor, cause the processor to perform a method of blocking access to files encrypted with a compromised encryption key, comprising:
maintaining a map of encryption keys and ranges of containers encrypted by respective encryption keys;
receiving an indication that an encryption key is compromised as a compromised key;
fencing a container range corresponding to data segments encrypted by the compromised key to prevent deduplication operations on the data segments;
making a point-in-time copy of the filesystem managing the data segments, wherein each file of the file system is represented as tree structure having a root level and one or more hierarchical lower levels;
iteratively inspecting, from the lowest level to a highest level, each container in each level of the file trees of the files to identify containers having segments encrypted by the compromised key for a corresponding level; and
marking files corresponding to the identified containers as not readable to block the access to the files encrypted with the compromised key, wherein the tree structure comprises a Merkle tree having stored fingerprints of data using a hashing method, and further wherein data is processed as part of a deduplication backup process executed by a data storage server, and wherein the backup process looks up the fingerprints in a hash table constituting an index to determine if the fingerprints exist or do not exist within the hash table, and if not, compressing and encrypting corresponding data segments into compression regions for storing in the containers, and yet further wherein a bitmap correlates a container identifier (ID) with a respective encryption key ID, and fingerprints contained in each container referenced by a container ID to tabulate all the fingerprints of the containers as the bitmap, and further comprising marking an entry in the bitmap for each fingerprint of an identified container having segments encrypted by the compromised key, as an impacted fingerprint.

* * * * *